United States Patent [19]
Saotome

[11] Patent Number: 5,953,465
[45] Date of Patent: Sep. 14, 1999

[54] INTERPOLATION PROCESSING METHOD AND APPARATUS FOR IMAGE SIGNALS HAVING IMPROVED IMAGE EDGE DIFFERENTIATION

[75] Inventor: Shigeru Saotome, Kanagawa-ken, Japan

[73] Assignee: Fuji Photo Film Co., Ltd., Kanagawa-ken, Japan

[21] Appl. No.: 08/818,006

[22] Filed: Mar. 14, 1997

[30] Foreign Application Priority Data

Mar. 15, 1996 [JP] Japan ................................. 8-058926

[51] Int. Cl.$^6$ ....................................... G06K 9/32
[52] U.S. Cl. ........................ 382/300; 382/276; 382/298; 382/301; 358/525
[58] Field of Search ................................. 382/300–301, 382/269, 299, 266, 274, 276–277, 298, 293, 172; 358/525, 428; 345/133; 348/587

[56] References Cited

U.S. PATENT DOCUMENTS

| | | | |
|---|---|---|---|
| 5,048,105 | 9/1991 | Adachi | 382/300 |
| 5,054,100 | 10/1991 | Tai | 382/300 |
| 5,194,941 | 3/1993 | Girmaldi et al. | 348/587 |
| 5,598,182 | 1/1997 | Berend et al. | 345/133 |
| 5,608,856 | 3/1997 | McInally | 345/442 |
| 5,737,101 | 4/1998 | Ito | 358/525 |

*Primary Examiner*—Leo H. Boudreau
*Assistant Examiner*—Ishrat Sherali
*Attorney, Agent, or Firm*—Sughrue, Mion, Zinn, Macpeak & Seas, PLLC

[57] ABSTRACT

A judgment is made as to whether an interpolation point in an original image is or is not located at an image edge portion. The judgment is made by using a threshold value having been set such that, as a desired level of sharpness of an interpolation image obtained from interpolation processing becomes low, the threshold value may become large. When an interpolation point is judged as being located at an image edge portion, an interpolated image signal component corresponding to the interpolation point is calculated with interpolation processing capable of keeping the image edge portion sharp. When an interpolation point is judged as not being located at an image edge portion, an interpolated image signal component corresponding to the interpolation point is calculated with the interpolation processing, which is carried out by combining interpolation processing for obtaining an interpolation image, which has a comparatively high sharpness, and interpolation processing for obtaining an interpolation image, which has a low sharpness.

7 Claims, 5 Drawing Sheets

INTERPOLATION PROCESSING METHOD AND APPARATUS FOR IMAGE SIGNALS HAVING IMPROVED IMAGE EDGE DIFFERENTIATION

BACKGROUND OF THE INVENTION

1. Field of the Invention

This invention relates to an interpolation processing method and apparatus for an image signal.

2. Description of the Prior Art

Techniques for photoelectrically reading out an image, which has been recorded on a photographic film, in order to obtain an image signal, carrying out appropriate image processing on the image signal, and then reproducing a visible image by use of the processed image signal have heretofore been known in various fields.

Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material, such as photographic material, or on a display device, such as a cathode ray tube (CRT) display device. Radiation image recording and reproducing systems, which use stimulable phosphor sheets, are advantageous over conventional radiography using silver halide photographic materials, in that images can be recorded even when the energy intensity of the radiation, to which the stimulable phosphor sheet is exposed, varies over a wide range.

In image recording and reproducing systems, in which an image signal is obtained in the manner described above and a visible image is reproduced from the image signal, in cases where the region of interest in the visible image is to be viewed in more detail, the region of interest is often enlarged and reproduced. In such cases, if the enlargement of the image size is carried out such that the number of the image signal components of the image signal representing the enlarged image may be identical with the number of the image signal components of the original image signal representing the original image, the sharpness of the enlarged image will be recognized to be lower than the sharpness of the original image due to the visual characteristics of persons. Therefore, if the image is merely enlarged and reproduced, an enlarged image having a high sharpness cannot be obtained, and the details of the image cannot be viewed accurately.

In order for the aforesaid problems to be eliminated, a predetermined interpolation processing may be carried out on the original image signal, which has been obtained by reading out an original image, and an interpolation image signal, which is a secondary image signal and is made up of a number of image signal components different from that of the original image signal, may thereby be formed. Specifically, in cases where an enlarged image is to be reproduced, an interpolation image signal, which is made up of a number of image signal components larger than that of the original image signal, may be formed from the interpolating operation. A visible image may then be reproduced from the interpolation image signal. In this manner, the sharpness of the enlarged image can be prevented from becoming low.

As the interpolation processing carried out on image signals, various methods have heretofore been proposed. Among such methods, the processing using third-order spline interpolating functions is popular. With the interpolation processing using the third-order spline interpolating functions, digital original image signal components ($Y_k$), which correspond to each set of two adjacent picture elements, are connected by a third-order function $\{f_k\}$. (The region between the two adjacent picture elements in each set is herein referred to as a section.) Also, the value of $f_k$ corresponding to a position, at which an interpolation point (i.e., a point that is to be inserted) is set, (i.e., a setting position in each section) is taken as the value of the interpolated image signal component.

The interpolating operations, which pass through the original image signal in the manner described above, are the interpolation processing capable of yielding an image having a comparatively high sharpness. As the interpolating functions for such interpolation processing, cubic spline interpolating functions, and the like, are known. How the cubic spline interpolating functions operate will be described hereinbelow.

Figure 2:
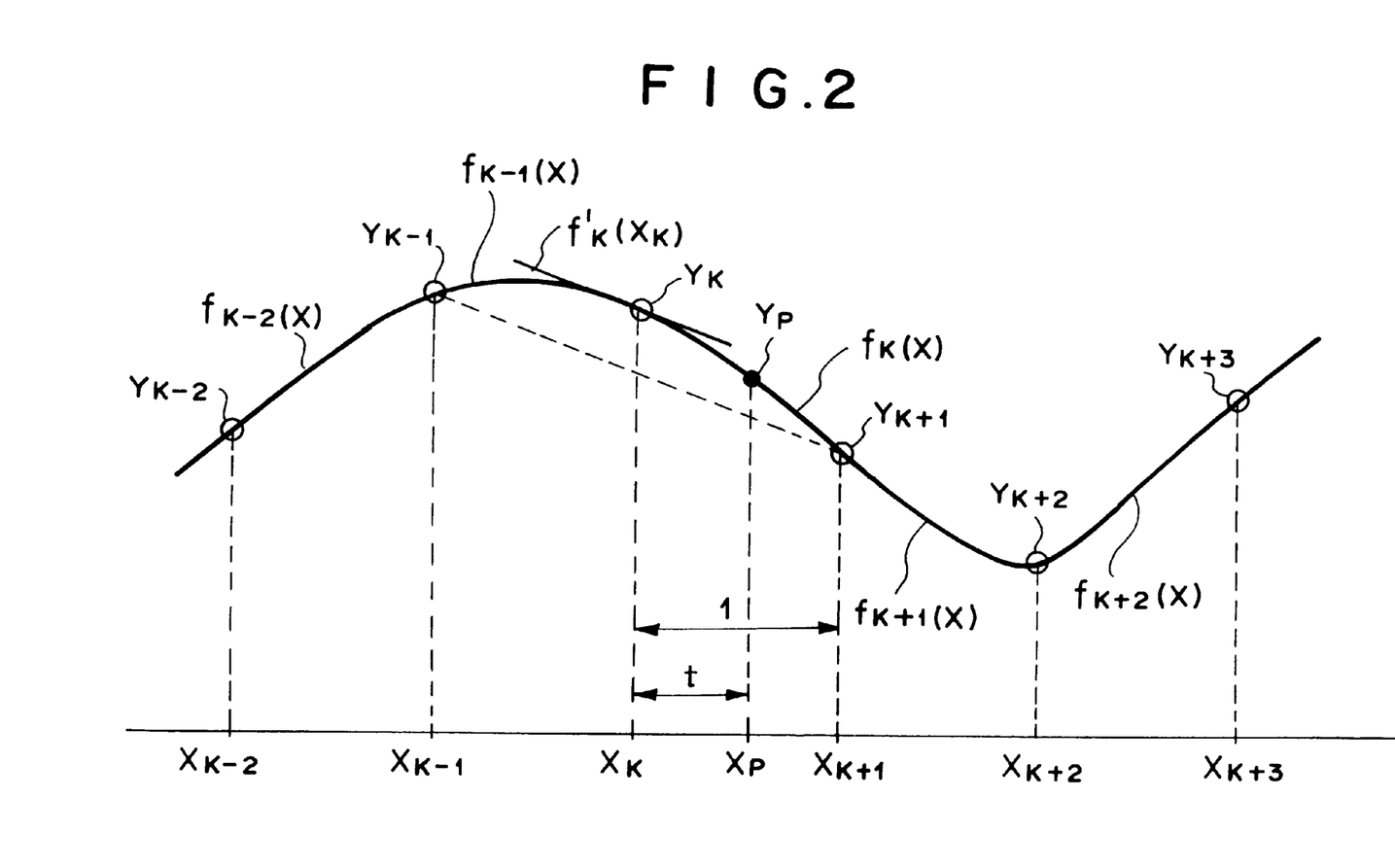
FIG. 2 is an explanatory graph showing how interpolated image signal components are obtained with a cubic spline interpolation processing from original image signal components, which are sampled with a period of an equal interval and represent sampling points (picture elements) arrayed in one direction.

FIG. 2 is an explanatory graph showing how interpolated image signal components are obtained with a cubic spline interpolation processing from original image signal components, which are sampled with a period of an equal interval and represent sampling points (picture elements) arrayed in one direction. As illustrated in FIG. 2, the image signal components (the original image signal components), which have been detected as digital signal components from an original image and represent a series of picture elements $X_{k-2}, X_{k-1}, X_k, X_{k+1}, X_{k+2}, \ldots$, are respectively represented by $Y_{k-2}, Y_{k-1}, Y_k, Y_{k+1}, Y_{k+2}, \ldots$ A third-order spline interpolating function is set for each of sections $X_{k-2}$~$X_{k-1}$, $X_{k-1}$~$X_k$, $X_k$~$X_{k+1}$, and $X_{k+1}$~$X_{k+2}$. The spline interpolating functions corresponding to the respective sections are represented by $f_{k-2}, f_{k-1}, f_k, f_{k+1}$, and $f_{k+2}$. The interpolating functions are the third-order functions, in which the position in each section serves as a variable.

Firstly, how the interpolating operation is carried out when an interpolation point $X_p$ falls within the section $X_k$~$X_{k+1}$ will be described hereinbelow. The spline interpolating function $f_k$ corresponding to the section $X_k$~$X_{k+1}$ is represented by Formula (1) shown below.

$$f_k(x) = A_k x^3 + B_k x^2 + C_k x + D_k \tag{1}$$

In the cubic spline interpolating function $f_k$, it is necessary that the function passes through the picture elements of the original image (i.e., the original sampling points), and that the first-order differential coefficient of the function is continuous between adjacent sections. Also, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Y_{k+1}-Y_{k-1})/(X_{k+1}-X_{k-1})$ of the image signal components $Y_{k-1}$ and $Y_{k+1}$ representing the picture elements $X_{k-1}$ and $X_{k+1}$.

From the conditions described above, an interpolated image signal component $Y_p$ corresponding to the interpolation point $X_p$ may be represented by Formula (2) shown below.

$$Y_p = \{(-t^3+2t^2-t)/2\}Y_{k-1} + \quad (2)$$
$$\{(3t^3-5t^2+2)/2\}Y_k +$$
$$\{(-3t^3+4t^2+t)/2\}Y_{k+1} +$$
$$\{(t^3-t^2)/2\}Y_{k+2}$$

The coefficients for the image signal components $Y_{k-1}$, $Y_k$, $Y_{k+1}$, and $Y_{k+2}$ are referred to as the interpolation coefficients $c_{k-1}$, $c_k$, $c_{k+1}$, and $c_{k+2}$. These interpolation coefficients may be represented by the formulas shown below.

$$c_{k-1}=(-t^3+2t^2-t)/2$$
$$c_k=(3t^3-5t^2+2)/2$$
$$c_{k+1}=(-3t^3+4t^2+t)/2$$
$$c_k=(t^3-t^2)/2$$

As described above, it is necessary that the cubic spline interpolating function passes through the original sampling points, and that the first-order differential coefficient of the cubic spline interpolating function is continuous between adjacent sections. With the cubic spline interpolating function, the interpolation image signal for use in the reproduction of a secondary image (i.e., the image obtained from the interpolating operation), which has a comparatively high sharpness, is obtained. On the other hand, as for a portion in the original image, at which the change in density is gentle, the interpolating operation should preferably be carried out such that a secondary image, in which the sharpness is comparatively low and which is smooth, may be obtained. As the interpolating function for obtaining the interpolation image signal representing the secondary image, in which the sharpness is comparatively low and which is smooth, for example, a B spline interpolating function is known. The B spline interpolating function need not pass through the original sampling points, and it is necessary that the first-order differential coefficient and the second-order differential coefficient {represented by f"(X)} of the B spline interpolating function are continuous between adjacent sections. Specifically, in Formula (1), Formula (3) shown below obtains.

$$Y_p = f_k(t) = \{(-t^3+3t^2-3t+1)/6\}Y_{k-1} + \quad (3)$$
$$\{(3t^3-6t^2+4)/6\}Y_k +$$
$$\{(-3t^3+3t^2+3t+1)/6\}Y_{k+1} +$$
$$(t^3/6)Y_{k+2}$$

Therefore, the interpolation coefficients $b_{k-1}$, $b_k$, $b_{k+1}$, and $b_{k+2}$, which respectively correspond to the image signal components $Y_{k-1}$, $Y_k$, $Y_{k+1}$ and $Y_{k+2}$, may be represented by the formulas shown below.

$$b_{k-1}=(-t^3+3t^2-3t+1)/6$$
$$b_k=(3t^3-6t^2+4)/6$$
$$b_{k+1}=(-3t^3+3t^2+3t+1)/6$$
$$b_{k+2}=t^3/6$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

In this manner, in cases where a secondary image (an interpolation image) having a high sharpness is to be reproduced, for example, the cubic spline interpolating function may be used. In cases where a secondary image, which has a low sharpness and is smooth, is to be reproduced, for example, the B spline interpolating function may be used.

In U.S. Pat. No. 5,048,105, the applicant proposed an interpolation processing method for an image signal, with which the sharpness of an interpolation image can be adjusted finely by, for example, weighting the corresponding coefficients of two interpolating functions, that provide different levels of sharpness, in accordance with a desired sharpness of the interpolation image, and adding the weighted coefficients to each other. With the proposed method, for example, in cases where the cubic spline interpolating function and the B spline interpolating function are employed as the two interpolating functions, that provide different levels of sharpness, the interpolation coefficients $c_{k-1}$, $c_k$, $c_{k+1}$, and $c_{k+2}$ in the cubic spline interpolating function and the interpolation coefficients $b_{k-1}$, $b_k$, $b_{k+1}$, and $b_{k+2}$ in the B spline interpolating function, which coefficients correspond to each other and are set for the respective original image signal components $Y_{k-1}$, $Y_k$, $Y_{k+1}$, and $Y_{k+2}$, are weighted and added to each other. By alteration of the weighting ratio (factor) a, it is possible to obtain a secondary image having a desired level of sharpness, which is intermediate in the range from the highest sharpness ($\alpha=0$) to the lowest smooth sharpness ($\alpha=1$).

Specifically, weighted interpolation coefficients $a_{k-1}$, $a_k$, $a_{k+1}$, and $a_{k+2}$ are set as shown below.

$$a_{k-1}=(1-\alpha)c_{k-1}+\alpha b_{k-1}$$
$$a_k=(1-\alpha)c_k+\alpha k$$
$$a_{k+1}=(1-\alpha)c_{k+1}+\alpha b_{k+1}$$
$$a_{k+2}=(1-\alpha)c_{k+2}+\alpha b_{k+2}$$

wherein $0 \leq \alpha \leq 1$.

In accordance with the thus obtained new interpolation coefficients $a_{k-1}$, $a_k$, $a_{k+1}$, and $a_{k+2}$, an interpolated image signal component $Y_p$ is calculated with Formula (4) shown below.

$$Y_p = a_{k-1}Y_{k-1} + a_kY_k + a_{k+1}Y_{k+1} + a_{k+2}Y_{k+2} \quad (4)$$

An actual image is composed of the picture elements arrayed in two-dimensional directions. Therefore, the interpolation coefficient $a_k$ is represented as the interpolation coefficient Bij or Cij corresponding to each of two different directions (an i direction and a j direction) of an array of picture elements in the image.

Also, in U.S. Ser. No. 08/679,830, the applicant proposed an interpolation processing method for an image signal, wherein the aforesaid weight factor a is not limited to values ranging from 0 to 1 and is set to be one of all real numbers, such that one of interpolation images having a wide variety of sharpness levels may be obtained. The interpolation images having a wide variety of sharpness levels include, for example, an interpolation image having a sharpness higher than the sharpness of the interpolation image, which is obtained from the cubic spline interpolating operation alone, and an interpolation image having a sharpness smoother than the sharpness of the interpolation image, which is obtained from the B spline interpolating operation alone.

Figure 4:
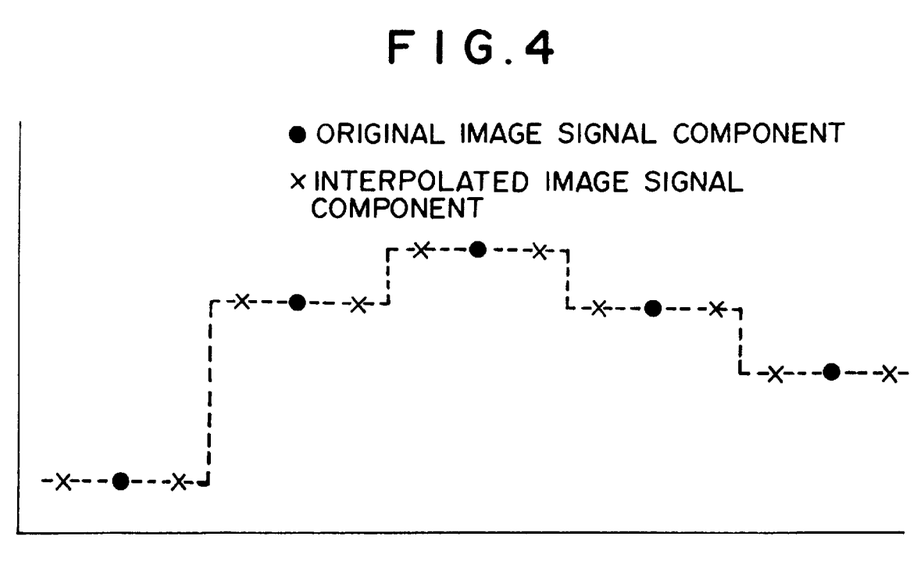
FIG. 4 is an explanatory graph showing how the interpolated image signal components are obtained with replication interpolation processing.

In cases where an interpolation point is located at an image edge portion, at which the change in the image signal (e.g., the change in the image density) is sharp, such as an edge of a character pattern, it is desired that the sharp condition of the image edge portion does not become unsharp due to the interpolation processing. FIG. 4 is an explanatory graph showing how the interpolated image signal components are obtained with replication interpolation processing. In such cases, for example, as illustrated in FIG. 4, a replication interpolation method (or a nearest neighbor interpolation method) may be employed appropriately, wherein the value of the interpolated image signal component at the interpolation point is set to be identical with the original image signal value representing the picture element in the original image, which picture element is nearest to the interpolation point. The replication interpolation method, or the like, has the advantages in that the condition of the image edge portion can be retained reliably.

Therefore, processing may be carried out in the manner described below. Specifically, a threshold value processing may be carried out on a received image signal, and a judgment may thereby be made as to whether an interpolation point, for which an interpolated image signal component is to be calculated, is or is not located at an image edge portion in the original image. In cases where it is judged that the interpolation point is located at the image edge portion, the interpolated image signal component with respect to the interpolation point may be calculated with the replication interpolation method. In cases where it is judged that the interpolation point is not located at the image edge portion, the interpolation processing with the weighting of two kinds of the interpolating functions, which processing is proposed in U.S. Ser. No. 08/679,830, may be utilized with respect to the interpolation point. (As an aid in facilitating the explanation, the interpolation processing with the weighting of two kinds of the interpolating functions will hereinbelow be referred to simply as the spline interpolation processing.)

In cases where such interpolation processing is employed, a high sharpness can be kept with respect to the image edge portion. As for the other image portions, the value of the factor a described above can be altered, and a desired level of sharpness can be obtained. In this manner, an interpolation image having a desired level of sharpness can be obtained.

Figure 8:
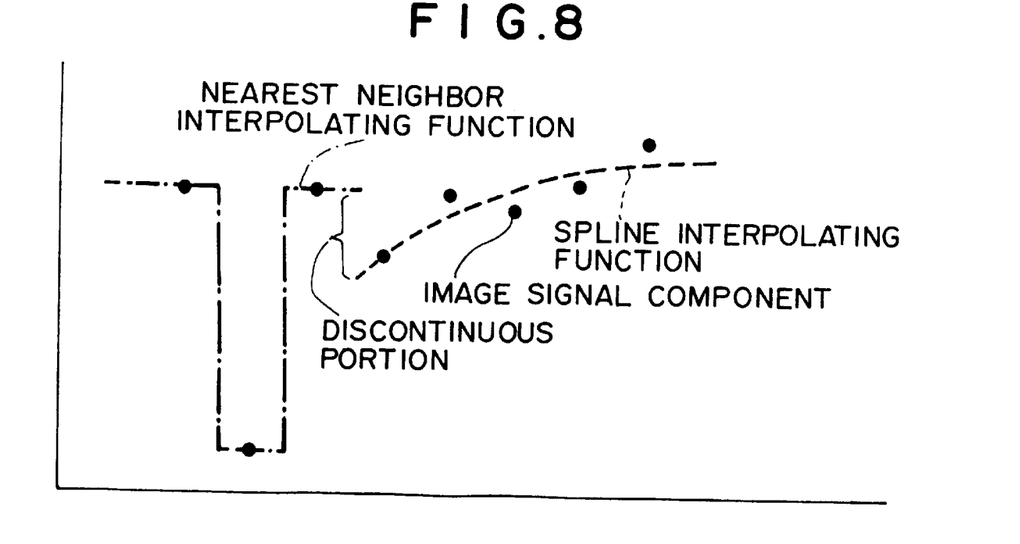
FIG. 8 is an explanatory graph showing a discontinuous portion occurring at a boundary between a replication interpolation processing and a spline interpolation processing.

FIG. 8 is an explanatory graph showing a discontinuous portion occurring at a boundary between a replication interpolation processing and a spline interpolation processing. As illustrated in, for example, FIG. 8, in cases where different interpolating operation methods are employed for the image edge portion and the other image portions, the curves of the interpolating functions become discontinuous at the boundary portion, at which the applied interpolation processing is changed over (for example, between the spline interpolation processing and the replication interpolation processing) As in the image edge portion, the interpolation image signal changes sharply at the portion at which the curves of the interpolating functions are discontinuous. Therefore, the discontinuous portion is perceived as an unnatural image density change in the obtained interpolation image.

The discontinuous portion becomes particularly perceptible when the sharpness of the portions other than the image edge portion is set to be low and a smooth interpolation image is to be thereby obtained.

Specifically, in cases where the sharpness of the portions other than the image edge portion is set to be high, the aforesaid factor a serving as the weighting ratio may be set to be a real number smaller than 0. The interpolating function for the spline interpolation processing, in which the factor a is set to be a real number smaller than 0, becomes very close to the interpolating function for the replication interpolation processing. Therefore, the problems do not occur in that only the discontinuity of the interpolation image signal (image density, or the like) at the boundary between the spline interpolation processing and the replication interpolation processing becomes perceptible, and in that an unnatural feeling is thus given by the obtained interpolation image.

However, in cases where a low level of sharpness is desired for the interpolation image, the aforesaid boundary portion becomes perceptible and is reproduced as an image edge portion having a high sharpness in the interpolation image, in which the image density changes smoothly as a whole. Therefore, an interpolation image giving an unnatural feeling is obtained.

SUMMARY OF THE INVENTION

The primary object of the present invention is to provide an interpolation processing method for an image signal, wherein an interpolation processing capable of keeping an image edge portion sharp, such as a replication interpolation processing, is applied to the image edge portion, wherein an interpolation processing capable of adjusting the sharpness so as to obtain an image having a desired level of sharpness, such as a spline interpolation processing, is applied to the image portions other than the image edge portion, and wherein, in cases where the level of sharpness desired for the image portions other than the image edge portion is low, a discontinuous image density (image signal) change occurring at a boundary between the two kinds of the interpolation processings is rendered imperceptible.

Another object of the present invention is to provide an apparatus for carrying out the interpolation processing method for an image signal.

Figure 3:
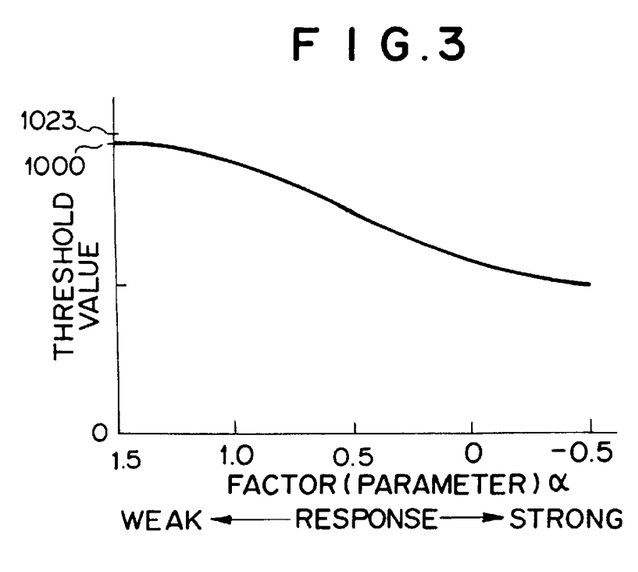
FIG. 3 is a graph showing a conversion table, which specifies the relationship between a factor a for determining sharpness and the corresponding threshold value.

The present invention provides an interpolation processing method for an image signal, wherein an interpolation processing for obtaining an interpolation image having a desired level of sharpness (which processing enables the sharpness to be adjusted) is carried out on an original image signal, which represents an original image, by combining an interpolation processing for obtaining an interpolation image, which has a comparatively high sharpness, and an interpolation processing for obtaining an interpolation image, which has a sharpness lower than the sharpness of the interpolation image, that is obtained from the interpolation processing for obtaining the interpolation image having the comparatively high sharpness, the method comprising the steps of:

i) making a judgment as to whether an interpolation point is or is not located at an image edge portion (such as an edge of a character pattern), at which a change in the original image signal is sharp, the judgment being made by using a threshold value having been set (for example, as indicated by the graph or the table illustrated in FIG. 3) such that, as the desired level of sharpness of the interpolation image obtained from the interpolation processing carried out by combining the two kinds of the interpolation processings becomes low (i.e., as the response becomes weak), the threshold value may become large, and ii) in cases where it has been judged that an interpolation point is located at an image edge portion, calculating an interpolated image signal component, which corresponds to the interpolation point, in accordance with an interpolation processing (such as a replication interpolation processing), which is capable of keeping the image edge portion sharp.

Specifically, in the interpolation processing method for an image signal in accordance with the present invention, in cases where the sharpness of the interpolation image should be set to be high, the threshold value used in making a judgment as to the presence or absence of the image edge portion is set to be small. In cases where the sharpness of the interpolation image should be set to be low, i.e. in cases where a smooth interpolation image is to be obtained, the threshold value is set to be large. The level of the threshold value used in making a judgment as to the presence or absence of the image edge portion is thus changed in accordance with the desired level of sharpness of the interpolation image. In this manner, in cases where an interpolation image having a particularly smooth sharpness is to be obtained, only an image portion, at which the signal value changes largely as in a binary image typified by a character pattern, or the like, is judged as being an image edge portion. With respect to only the signal change portion having been judged as being an image edge portion, the interpolation processing capable of keeping the image edge portion sharp, such as the replication interpolation processing, is applied.

Figure 5:
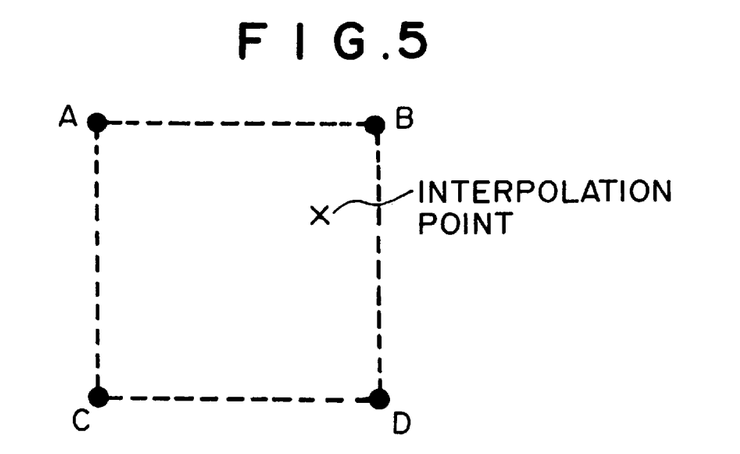
FIG. 5 is an explanatory view showing how a judgment is made as to the presence or absence of an image edge portion.

By way of example, the judgment as to whether an interpolation point is or is not located at an image edge portion may be made by comparing the results of an operation carried out on the image signal components of the original image signal representing four picture elements in the original image, which picture elements neighbor the interpolation point, and the threshold value with each other. FIG. 5 is an explanatory view showing how a judgment is made as to the presence or absence of an image edge portion. Specifically, as illustrated in FIG. 5, with respect to four picture elements (lattice points) A, B, C, and D in the original image, which surround an interpolation point indicated by the "x" mark, the differences among the image signal components SA, SB, SC, and SD representing the lattice points may be calculated. In cases where at least one of the thus obtained six difference values is larger than the threshold value, it may be judged that the interpolation point is located at an image edge portion. In the other cases, it may be judged that the interpolation point is not located at an image edge portion. Such a judgment technique can be carried out simply and is practically appropriate. Alternatively, any of other known edge judgment techniques may be employed.

As described above, as one of the interpolation processing capable of keeping the image edge portion sharp, the replication interpolation processing may be employed. With the replication interpolation processing, as illustrated in FIG. 4, in which original image signal components are indicated by the black dot mark, the value of an interpolated image signal component (indicated by the "x" mark) at an interpolation point is set to be identical with the value of the original image signal component (indicated by the black dot mark) representing the picture element in the original image, which picture element is nearest to the interpolation point. (That is, the original image signal component is replicated as the interpolated image signal component.)

Also, as the interpolation processing for obtaining the interpolation image, which has a comparatively high sharpness, for example, the interpolation processing with the cubic spline interpolating function may be utilized. In such cases, as the interpolation processing for obtaining the interpolation image, which has a sharpness lower than the sharpness of the interpolation image, that is obtained from the interpolation processing for obtaining the interpolation image having the comparatively high sharpness, for example, the interpolation processing with the B spline interpolating function should preferably be utilized.

Further, in the interpolation processing method for an image signal in accordance with the present invention, the interpolation processing for obtaining the interpolation image having a desired level of sharpness is carried out on the original image signal by combining the interpolation processing for obtaining the interpolation image, which has a comparatively high sharpness, and the interpolation processing for obtaining the interpolation image, which has a sharpness lower than the sharpness of the interpolation image, that is obtained from the interpolation processing for obtaining the interpolation image having the comparatively high sharpness. Specifically, in the interpolation processing for obtaining the interpolation image having a desired level of sharpness, in cases where the cubic spline interpolating function and the B spline interpolating function are employed, the interpolation coefficients $c_{k-1}$, $c_k$, $c_{k+1}$, and $c_{k+2}$ in the cubic spline interpolating function and the interpolation coefficients $b_{k-1}$, $b_k$, $b_{k+1}$, and $b_{k+2}$ in the B spline interpolating function, which coefficients correspond to each other and are set for the respective original image signal components $Y_{k-1}$, $Y_k$, $Y_{k+1}$, and $Y_{k+2}$, are weighted and added to each other. By alteration of the weighting ratio a, a secondary image is obtained, which comprises the interpolated image signal component $Y_p$ represented by Formula (4) shown below and has a desired level of sharpness, that falls within the range from a high sharpness to a smooth sharpness or is outside this range.

Specifically, the weighted interpolation coefficients $a_{k-1}$, $a_k$, $a_{k+1}$, and $a_{k+2}$ are set as shown below.

$$a_{k-1}=(1-\alpha)c_{k-1}+\alpha b_{k-1}$$

$$a_k=(1-\alpha)c_k+\alpha b_k$$

$$a_{k+1}=(1-\alpha)c_{k+1}+\alpha b_{k+1}$$

$$a_{k+2}=(1-\alpha)c_{k+2}+\alpha b_{k+2}$$

Also, the interpolated image signal component $Y_p$ is calculated with Formula (4) shown below.

$$Y_p=a_{k-1}Y_{k-1}+a_kY_k+a_{k+1}Y_{k+1}+a_{k+2}Y_{k+2} \tag{4}$$

The present invention also provides an apparatus for carrying out the interpolation processing method for an image signal in accordance with the present invention. Specifically, the present invention also provides an interpolation processing apparatus for an image signal, comprising an interpolation processing means for carrying out an interpolation processing on an original image signal, which represents an original image, the interpolation processing being carried out for obtaining an interpolation image having a desired level of sharpness and by combining an interpolation processing for obtaining an interpolation image, which has a comparatively high sharpness, and an interpolation processing for obtaining an interpolation image, which has a sharpness lower than the sharpness of the interpolation image, that is obtained from the interpolation processing for obtaining the interpolation image having the comparatively high sharpness, wherein the improvement comprises the provision of:

i) a judgment means for making a judgment as to whether an interpolation point is or is not located at an image edge portion, at which a change in the original image signal is sharp, the judgment being made by using a predetermined threshold value, ii) a conversion table specifying the relationship between the desired level of sharpness of the interpolation image, which is obtained from the interpolation processing carried out by combining the two kinds of the interpolation processings, and the corresponding predetermined threshold value (for example, as illustrated in FIG. 3) such that, as the desired level of sharpness of the interpolation image becomes low, the predetermined threshold value may become large, iii) a second interpolation processing means for calculating an interpolated image signal component in accordance with an interpolation processing (such as a replication interpolation processing), which is capable of keeping an image edge portion sharp, the interpolation processing means for carrying out the interpolation processing for obtaining the interpolation image having the desired level of sharpness being taken as a first interpolation processing means, and iv) a change-over means for changing the interpolation processing with respect to an interpolation point over to the interpolation processing, which is carried out by the second interpolation processing means, in cases where it has been judged by the judgment means that the interpolation point is located at an image edge portion.

With the interpolation processing method and apparatus for an image signal in accordance with the present invention, the level of the threshold value, which is used in making a judgment from the original image signal as to whether an interpolation point is or is not located at an image edge portion, is changed in accordance with the level of sharpness desired for the interpolation image, which is obtained from the interpolation processing. In this manner, the range of the image edge portion, to which the interpolation processing capable of keeping the image edge portion sharp, such as the replication interpolation processing, is applied, is altered between when the desired level of sharpness of the interpolation image is high and when the desired level of sharpness of the interpolation image is low.

Specifically, as illustrated in FIG. 3, in cases where the desired level of sharpness of the interpolation image, which is obtained from the spline interpolation processing represented by Formula (4) shown above, is low (i.e., the sharpness is smooth), the threshold value is set to be very large. For example, in cases where the dynamic range of the image density value of the image is represented by digital values of 0 to 1,023, the threshold value, which is used in making a judgment as to whether an interpolation point is or is not located at an image edge portion, is set to be approximately 1,000. As a result, only when the interpolation point is located at a very strong image edge portion, at which the change in the signal value (the change in the image density) is larger than the threshold value, or at an edge of a character pattern, which takes on the form of a binary image, the interpolation point is judged as being located at the image edge portion.

As for an interpolation point located at a weak signal change portion, at which the change in the signal value is not larger than the threshold value, the interpolation processing capable of keeping the image edge portion sharp, such as the replication interpolation processing, is not applied, and the spline interpolation processing described above is applied.

Therefore, the problems can be prevented from occurring in that, when a smooth interpolation image is to be obtained, the interpolation processing with respect to an interpolation point located at an edge portion, at which the change in the image density is not very large, (i.e., an image density change portion, which is not judged as being located at an image edge portion by the aforesaid judgment operation) is often changed over to the replication interpolation processing, or the like. As a result, the problems can be prevented from occurring in that many discontinuous portions occur between the replication interpolation processing, or the like, and the spline interpolation processing, and in that an interpolation image giving an unnatural feeling is obtained.

Also, with respect to an interpolation point, which is located at the very strong image edge portion or the edge of the character pattern, the replication interpolation processing, or the like, is carried out. As a result, a discontinuous portion occurs between the replication interpolation processing, or the like, and the spline interpolation processing. However, even if the discontinuous portion occurs at the very strong image edge portion or the edge of the character pattern, since the response at the image edge portion is strong, the discontinuous portion will not become visually perceptible.

As illustrated in FIG. 3, in cases where the desired level of sharpness of the interpolation image, which is obtained from the spline interpolation processing represented by Formula (4) shown above, is high, the threshold value is set to be small. Therefore, a weak image density change portion is also judged as being located at an image edge portion, and the replication interpolation processing, or the like, and the spline interpolation processing are often changed over to each other. As a result, many discontinuous portions occur between the two kinds of the interpolation processings. However, in the region in which the level of the sharpness desired for the interpolation image is high, the interpolation curve of the spline interpolation processing represented by Formula (4) becomes close to the interpolation curve of the replication interpolation processing, or the like. Therefore, with only the spline interpolation processing, the same phenomenon as that of the discontinuous portion occurs. As a result, the problems do not occur in that only the discontinuous portion occurring due to the change-over of the interpolation processing becomes visually perceptible, and in that an interpolation image giving an unnatural feeling is obtained due to the change-over of the interpolation processing.

As described above, with the interpolation processing method and apparatus for an image signal in accordance with the present invention, even if the level of sharpness desired for the interpolation image is low, a discontinuous image density change occurring at the boundary between the replication interpolation processing, or the like, and the spline interpolation processing can be rendered imperceptible.

DESCRIPTION OF THE PREFERRED EMBODIMENTS

The present invention will hereinbelow be described in further detail with reference to the accompanying drawings.

Figure 1:
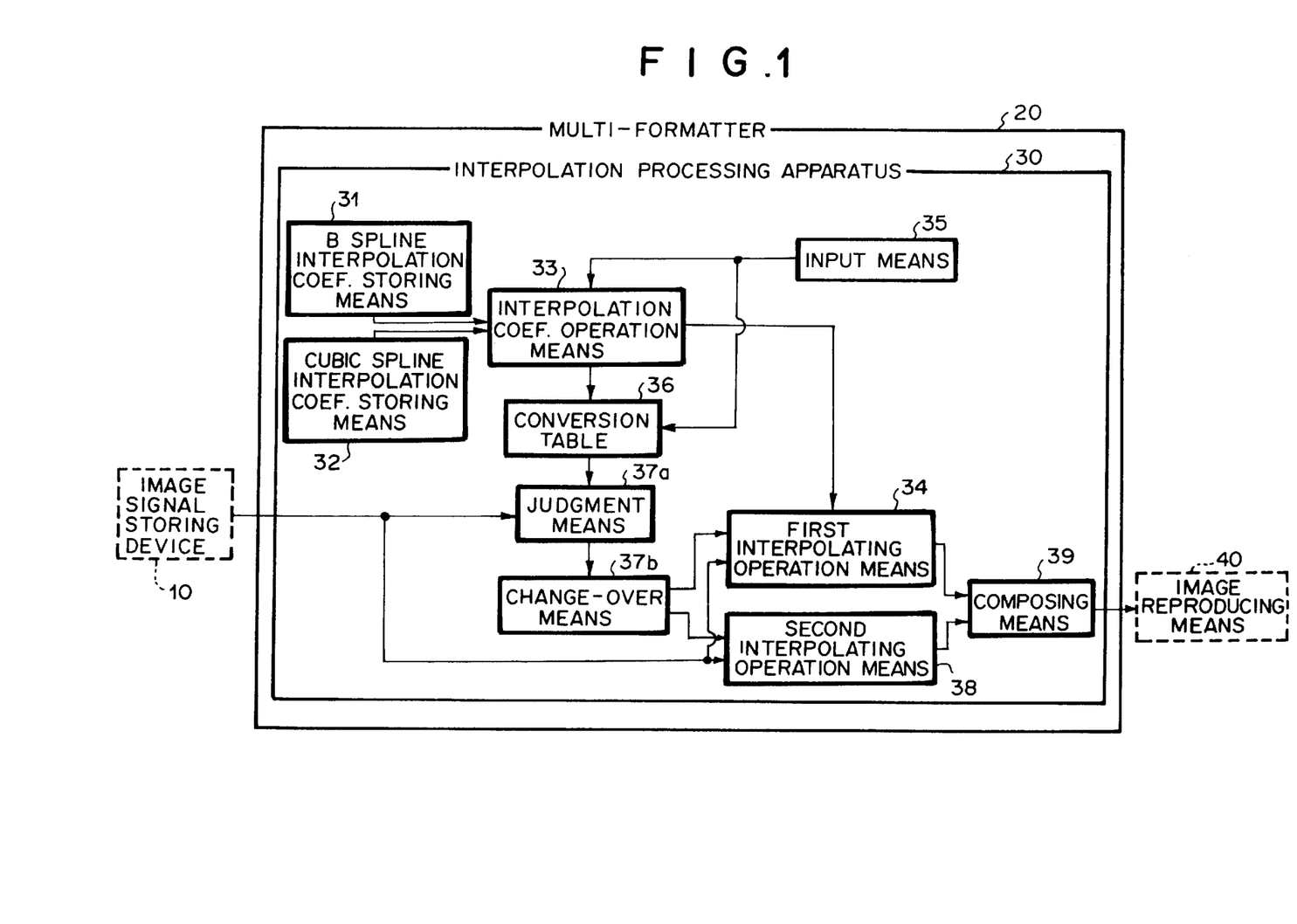
FIG. 1 is a schematic block diagram showing an image reproducing system provided with an embodiment of the interpolation processing apparatus for carrying out the interpolation processing method for an image signal in accordance with the present invention.

FIG. 1 is a schematic block diagram showing an image reproducing system provided with an interpolation processing apparatus 30, which is an embodiment of the interpolation processing apparatus for carrying out the interpolation processing method for an image signal in accordance with the present invention. With reference to FIG. 1, the image reproducing system comprises an image signal storing device 10 for storing an image signal Sorg representing an image, and a multi-formatter 20 for carrying out predetermined signal processing on the image signal (hereinbelow referred to as the primary image signal or the original image signal) Sorg, which is received from the image signal storing device 10, such that an image signal conforming to a predetermined reproduction format may be obtained. The image reproducing system also comprises an image reproducing means 40 for reproducing a visible image in the predetermined reproduction format from an image signal (hereinbelow referred to as the secondary image signal or the interpolation image signal) S', which has been obtained from the predetermined signal processing carried out by the multi-formatter 20.

The multi-formatter 20 carries out the signal processing on the primary image signal Sorg, such that an image signal conforming to one of various image reproduction formats may be obtained. Examples of the image reproduction formats include a format, in which the entire area of a single sheet of film is divided into four different small regions and four different images having reduced image sizes are printed respectively in the four regions, a format, in which a single large image is printed directly on a single sheet of film, and a format, in which a portion of an image is enlarged and the enlarged image portion is printed on a sheet of film. The multi-formatter 20 is provided with the interpolation processing apparatus 30 in accordance with the present invention, which carries out an interpolating operation for obtaining the secondary image signal (the interpolation image signal) made up of a number of image signal components different from that of the image signal components of the primary image signal Sorg when the image size is to be enlarged or reduced.

As illustrated in FIG. 2, the primary image signal Sorg used in this embodiment is made up of a series of digital image signal components $Y_{k-2}, Y_{k-2}, Y_k, Y_{k+1}, Y_{k+2}, \ldots$ respectively corresponding to sampling points (picture elements) $X_{k-2}, X_{k-1}, X_k, X_{k+1}, X_{k+2}, \ldots$, which are sampled with a period of an equal interval and arrayed in one direction.

The interpolation processing apparatus 30, which is incorporated in the multi-formatter 20, comprises a cubic spline interpolation coefficient storing means 32, a B spline interpolation coefficient storing means 31, an interpolation coefficient operation means 33, and an input means 35. The interpolation processing apparatus 30 also comprises a first interpolating operation means 34, a judgment means 37a, a conversion table 36, a second interpolating operation means 38, a change-over means 37b, and a composing means 39.

The cubic spline interpolation coefficient storing means 32 stores information representing interpolation coefficients $c_{k-1}, c_k, c_{k+1}$, and $c_{k+2}$, which respectively correspond to the original image signal components $Y_{k-1}, Y_k, Y_{k+1}$, and $Y_{k+2}$, in Formula (2). Formula (2) serves as a third-order cubic spline interpolating operation formula and represents a first secondary image signal component $Y_p1$ corresponding to an interpolation point $X_p$, which is located between original sampling points $X_k$ and $X_{k+1}$. The interpolation coefficients $c_{k-1}, c_k, c_{k+1}$, and $c_{k+2}$ are stored as being the ones represented by the formulas shown below.

$$Y_p1 = c_{k-1}Y_{k-1} + c_kY_k + c_{k+1}Y_{k+1} + c_{k+2}Y_{k+2} \qquad (2)$$

$$c_{k-1} = (-t^3 + 2t^2 - t)/2$$

$$c_k = (3t^3 - 5t^2 + 2)/2$$

$$c_{k+1} = (-t^3 + 4t^2 + t)/2$$

$$c_{k+2} = (t^3 - t^2)/2$$

in which t, where $0 \leq t \leq 1$, represents the position of the interpolation point $X_p$, the position being taken with respect to the picture element $X_k$, that serves as a reference position, and in the direction heading toward the picture element $X_{k+1}$, the lattice interval being set to be equal to 1.

The B spline interpolation coefficient storing means 31 stores information representing interpolation coefficients $b_{k-1}, b_k, b_{k+1}$, and $b_{k+2}$, which respectively correspond to the original image signal components $Y_{k-1}, Y_k, Y_{k+1}$, and $Y_{k+2}$, in Formula (3). Formula (3) serves as a third-order B spline interpolating operation formula and represents a second secondary image signal component $Y_p2$ corresponding to the interpolation point $X_p$, which is located between original sampling points $X_k$ and $X_{k+1}$. The interpolation coefficients $b_{k-1}, b_k, b_{k+1}$, and $b_{k+2}$ are stored as being the ones represented by the formulas shown below.

$$Y_p2 = b_{k-1}Y_{k-1} + b_kY_k + b_{k+1}Y_{k+1} + b_{k+2}Y_{k+2} \qquad (3)$$

$$b_{k-1} = (-t^3 + 3t^2 - 3t + 1)/6$$

$$b_k = (3t^3 - 6t^2 + 4)/6$$

$$b_{k+1} = (-3t^3 + 3t^2 + 3t + 1)/6$$

$$b_{k+2} = t^3/6$$

in which t, where $0 \leq t \leq 1$, represents the position of the interpolation point $X_p$, the position being taken with respect to the picture element $X_k$, that serves as a reference position, and in the direction heading toward the picture element $X_{k+1}$, the lattice interval being set to be equal to 1.

The interpolation coefficient operation means 33 receives the interpolation coefficients (hereinbelow referred to as the cubic spline interpolation coefficients) $c_{k-1}$, $c_k$, $c_{k+1}$, and $c_{k+2}$ from the cubic spline interpolation coefficient storing means 32 and receives the interpolation coefficients (hereinbelow referred to as the B spline interpolation coefficients) $b_{k-1}$, $b_k$, $b_{k+1}$, and $b_{k+2}$ from the B spline interpolation coefficient storing means 31. The interpolation coefficient operation means 33 weights and adds the cubic spline interpolation coefficients $c_{k-1}$, $c_k$, $c_{k+1}$, and $c_{k+2}$ and the B spline interpolation coefficients $b_{k-1}$, $b_k$, $b_{k-1}$, and $b_{k+2}$, which coefficients correspond to each other and are set for the respective original image signal components $Y_{k-1}$, $Y_k$, $Y_{k+1}$, and $Y_{k+2}$. The weighted additions are carried out with Formulas (5), (6), (7), and (8):

$$a_{k-1} = (1-\alpha)c_{k-1} + \alpha b_{k-1} = \{(2\alpha - 3)t^3 - (3\alpha - 6)t^2 - 3t + \alpha\}/6 \quad (5)$$

$$a_k = (1-\alpha)c_k + \alpha b_k = \{(9 - 6\alpha)t^3 + (9\alpha - 15)t^2 + (6 - 2\alpha)\}/6 \quad (6)$$

$$a_{k+1} = (1-\alpha)c_{k+1} + \alpha b_{k+1} = \{(6\alpha - 9)t^3 - (9\alpha - 12)t^2 + 3t + \alpha\}/6 \quad (7)$$

$$a_{k+2} = (1-\alpha)c_{k+2} + \alpha b_{k+2} = \{(3 - 2\alpha)t^3 + (3\alpha - 3)t^2\}/6 \quad (8)$$

The input means 35 is used to input an arbitrary value of the parameter $\alpha$, which determines the weighting ratio (i.e., the sharpness), into the interpolation coefficient operation means 33.

The first interpolating operation means 34 stores information representing Formula (4) shown below as the operation formula with the third-order spline interpolating function and calculates the value of the interpolated image signal component $Y_p$, which corresponds to the interpolation point $X_p$, with Formula (4) in accordance with the interpolation coefficients $a_{k-1}$, $a_k$, $a_{k+1}$, and $a_{k+2}$ according to the parameter $\alpha$, which have been calculated by the interpolation coefficient operation means 33, and the original image signal components $Y_{k-1}$, $Y_k$, $Y_{k+1}$, and $Y_{k+2}$.

$$Y_p = a_{k-1}Y_{k-1} + a_k Y_k + a_{k+1}Y_{k+1} + a_{k+2}Y_{k+2} \quad (4)$$

The judgment means 37a makes a judgment as to whether the interpolation point $X_p$ is or is not located at an image edge portion in the original image. The judgment is made by using a predetermined threshold value.

As illustrated in FIG. 3, the conversion table 36 specifies the relationship between the parameter $\alpha$ and the threshold value such that, as the value of the parameter $\alpha$ becomes large, i.e. as the response of the interpolation image becomes weak, the threshold value may become large.

The second interpolating operation means 38 calculates the value of the interpolated image signal component $Y_p$ in accordance with the replication interpolation processing.

The change-over means 37b changes the first interpolating operation means 34 and the second interpolating operation means 38 over to each other. Specifically, in cases where it has been judged by the judgment means 37a that the interpolation point $X_p$ is located at the image edge portion, the change-over means 37b changes the interpolating operation means over such that the interpolation processing with the second interpolating operation means 38 may be applied with respect to the interpolation point $X_p$. Also, in cases where it has been judged by the judgment means 37a that the interpolation point $X_p$ is not located at the image edge portion, the change-over means 37b changes the interpolating operation means over such that the interpolation processing with the first interpolating operation means 34 may be applied with respect to the interpolation point $X_p$.

The composing means 39 composes the interpolation image signal from the interpolated image signal components, which correspond to the interpolation points located at image portions other than the image edge portion and have been obtained from the interpolation processing carried out by the first interpolating operation means 34, and the interpolated image signal components, which correspond to the interpolation points located at the image edge portion and have been obtained from the interpolation processing carried out by the second interpolating operation means 38.

The cubic spline interpolation coefficients $c_{k-1}$, $c_k$, $c_{k-1}$, and $c_{k+2}$, which are stored in the cubic spline interpolation coefficient storing means 32, and the B spline interpolation coefficients $b_{k-1}$, $b_k$, $b_{k+1}$, and $b_{k+2}$, which are stored in the B spline interpolation coefficient storing means 31, are calculated previously with the algorithms described above. Also, the parameter $\alpha$ can take all real numbers.

An actual image is composed of the picture elements arrayed in two-dimensional directions. Therefore, the interpolation coefficients $a_{k-1} \sim a_{k+2}$, the interpolation coefficients $b_{k-1} \sim b_{k+2}$, and the interpolation coefficients $c_{k-1} \sim c_{k+2}$ are calculated for each of two different directions (for example, an i direction and a j direction, which intersect perpendicularly to each other) of an array of the picture elements in the image.

The interpolation coefficient operation means 33 may store the information representing the interpolation coefficients $b_{k-1} \sim b_{k+2}$ and the interpolation coefficients $c_{k-1} \sim c_{k+2}$ in Formulas (5), (6), (7), and (8). In such cases, the B spline interpolation coefficient storing means 31 and the cubic spline interpolation coefficient storing means 32 can be omitted.

In the image reproducing system provided with this embodiment, the interval of the image signal components of the interpolation image signal S' is extended such that it may become equal to the interval of the image signal components of the original image signal Sorg. In this manner, the interpolation image is reproduced as an image enlarged from the original image. The enlargement processing is carried out with the functions of the multi-formatter 20. For this purpose, the multi-formatter 20 receives information, which represents a desired image size enlargement scale factor, from an input means (not shown). The interpolation points are set in accordance with the image size enlargement scale factor.

In the replication interpolation processing carried out by the second interpolating operation means 38, the value of the interpolated image signal component at a the interpolation point is set to be identical with the original image signal value representing the sampling point in the original image, which sampling point is nearest to the interpolation point.

How the image reproducing system provided with this embodiment operates will be described hereinbelow.

Firstly, the multi-formatter 20 reads the primary image signal Sorg from the image signal storing device 10. Also, in order to obtain the interpolation image signal, which represents an enlarged image corresponding to the image size enlargement scale factor inputted from the input means (not shown), the multi-formatter 20 feeds the primary image signal Sorg into the interpolation processing apparatus 30, which is incorporated in the multi-formatter 20.

In the interpolation processing apparatus 30, the primary image signal Sorg is fed into the first interpolating operation means 34, the second interpolating operation means 38, and the judgment means 37a.

The B spline interpolation coefficient storing means 31 and the cubic spline interpolation coefficient storing means 32 set the values of t, which represent the positions of interpolation points, in accordance with the image size enlargement scale factor having been inputted from the input means (not shown), which is connected to the multi-formatter 20. For example, in cases where an image size enlargement scale factor of 2 is inputted, a single interpolation point is set between two adjacent original sampling points, such that it may divide the interval between the two adjacent original sampling points into two equal parts, and values of 0.5 and 1.0 are set as the values of t. In cases where an image size enlargement scale factor of 3 is inputted, two interpolation points are set between two adjacent sampling points, such that the interpolation points may divide the interval between the two adjacent sampling points into three equal parts, and values of 0.333, 0.666, and 1.0 (=0.999) are set as the values of t. In cases where an image size enlargement scale factor of 10 is inputted, nine interpolation points are set between two adjacent sampling points, such that the interpolation points may divide the interval between the two adjacent sampling points into ten equal parts, and values of 0.1, 0.2, . . . , 1.0 are set as the values of t.

Information representing the B spline interpolation coefficients and the cubic spline interpolation coefficients, which are for each of the thus set values of t, is fed into the interpolation coefficient operation means 33.

Also, information representing a value of the parameter (i.e., the factor) $\alpha$ corresponding to a level of sharpness desired for the secondary image is inputted into the input means 35. The information representing the value of the parameter $\alpha$ is also fed into the interpolation coefficient operation means 33. The information representing the value of the parameter $\alpha$ is further fed into the conversion table 36.

The information representing the value of the parameter $\alpha$ may be directly inputted by an operator from the exterior. Alternatively, information representing the response R, which corresponds to the level of sharpness desired for the interpolation image, may be inputted by the operator, and the response R may be converted into the corresponding parameter $\alpha$ in the input means 35, for example, in accordance with a conversion table. In cases where the input means 35 is constituted in this manner, it becomes possible to specify the parameter $\alpha$ by the response R, with which the extent of the change in the sharpness can be grasped as an actual feeling.

The interpolation coefficient operation means 33 calculates the new interpolation coefficients $a_{k-1}$, $a_k$, $a_{k+1}$, and $a_{k+2}$ for each of the values of t, which values are in accordance with the value of the parameter $\alpha$. The calculations are made from the received B spline interpolation coefficients and the received cubic spline interpolation coefficients, which are for each of the values of t, as well as the parameter $\alpha$. The calculations are carried out with Formulas (5), (6), (7), and (8).

The information representing the calculated new interpolation coefficients $a_{k-1}$, $a_k$, $a_{k+1}$, and $a_{k+2}$ is fed into the first interpolating operation means 34.

The conversion table 36 determines the threshold value, which is used in making a judgment as to the presence or absence of an image edge portion and corresponds to the parameter $\alpha$, in accordance with the parameter $\alpha$ having been received from the input means 35. As will be clear from FIG. 3, as the value of the parameter $\alpha$ becomes large, i.e. as the response of the interpolation image becomes weak, the threshold value becomes large.

The information representing the determined threshold value is fed into the judgment means 37a. The judgment means 37a also receives the primary image signal from the image signal storing device 10. As illustrated in FIG. 5, with respect to a unit lattice constituted of four sampling points A, B, C, and D surrounding an interpolation point P, the judgment means 37a calculates the differences |SA−SB|, |SA−SC|, |SA−SD|, |SB−SC|, |SB−SD|, and |SC−SD| among the primary image signal components SA, SB, SC, and SD, which represent the respective sampling points in the unit lattice. Each of the differences represents the difference in the image density value between adjacent sampling points. Therefore, a large value of the difference indicates the presence of an image edge portion at the corresponding region. Conversely a small value of the difference indicates that the corresponding region is a flat image density portion, at which the image density value does not change largely.

The judgment means 37a compares each of the difference values and the threshold value, which has been received from the conversion table 36, with each other. In cases where at least one of the difference values is larger than the threshold value, the judgment means 37a judges that an image edge portion is located in the region between the sampling points, which are associated with the difference value larger than the threshold value.

Conversely, in cases where all of the difference values are smaller than the threshold value (or are equal to the threshold value), the judgment means 37a judges that no image edge portion is located between every set of adjacent sampling points.

In cases where it has been judged with respect to an interpolation point that an image edge portion is located, the change-over means 37b changes the interpolating operation means over to the second interpolating operation means 38. Therefore, as the operation for the interpolated image signal component with respect to the interpolation point, the replication interpolation processing is carried out by the second interpolating operation means 38. In cases where it has been judged with respect to an interpolation point that an image edge portion is not located, the change-over means 37b changes the interpolating operation means over to the first interpolating operation means 34. Therefore, as the operation for the interpolated image signal component with respect to the interpolation point, the processing with Formula (4), which is the third-order spline interpolating operation formula, is carried out by the first interpolating operation means 34. In this manner, the interpolated image signal component $Y_p$ with respect to the interpolation point $X_p$ for each value of t is calculated.

The interpolated image signal components, which correspond to the respective interpolation points and have been obtained from the first interpolating operation means 34, and the interpolated image signal components, which correspond to the respective interpolation points and have been obtained from the second interpolating operation means 38, are fed into the composing means 39.

The composing means 39 composes the interpolation image signal S', which is to be used for reproducing the interpolation image, from the interpolated image signal components, which correspond to the respective interpolation points and have been obtained from the first interpolating operation means 34, and the interpolated image signal components, which correspond to the respective interpolation points and have been obtained from the second interpolating operation means 38. The interpolation image signal S' is fed into the image reproducing means 40.

The image reproducing means 40 reproduces a visible image from the received interpolation image signal S'.

The sharpness of the reproduced visible image (i.e., the reproduced interpolation image) can be adjusted easily by merely changing the value of the inputted parameter α. Also, the level of the threshold value, which is used in making a judgment as to whether an interpolation point is or is not located at an image edge portion, is altered in accordance with the parameter α. Therefore, in cases where the sharpness of the interpolation image is set to be low, an image density change portion, which will be judged as being located at an image edge portion when the sharpness of the interpolation image is set to be high, is not judged as being located at the image edge portion. Accordingly, with respect to a smooth interpolation image, the interpolation processing can be prevented from being changed over to the replication interpolation processing, which is carried out by the second interpolating operation means 38. As a result, the problems can be prevented from occurring in that many discontinuous portions, at which the image density is discontinuous, occur between the replication interpolation processing and the spline interpolation processing, and in that an interpolation image giving an unnatural feeling is obtained.

Figure 6:
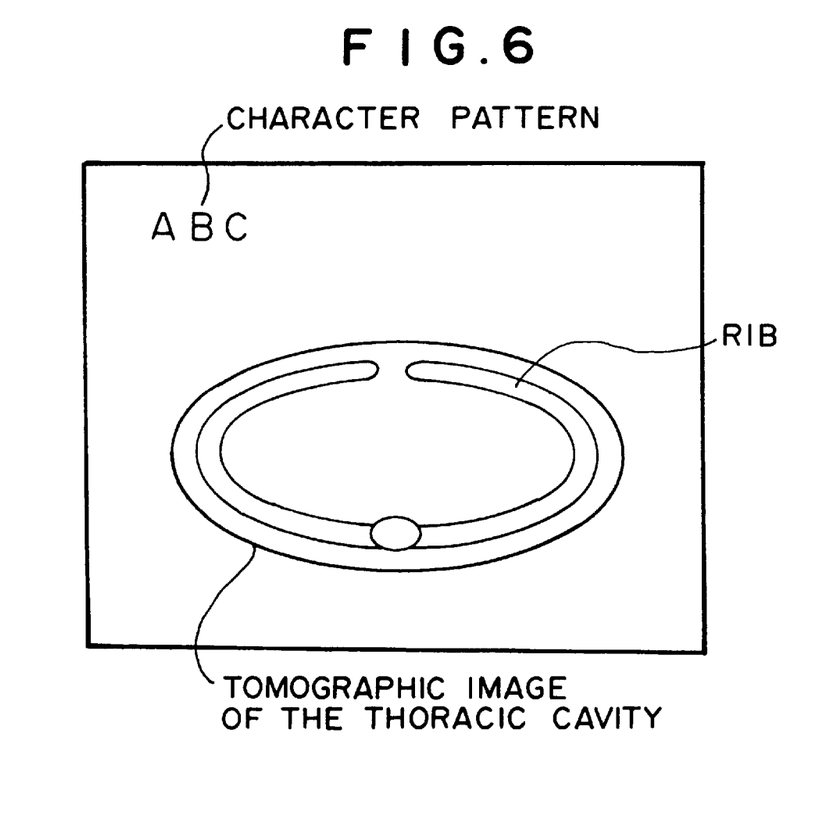
FIG. 6 is a schematic view showing a tomographic image of the thoracic cavity.

For example, in the tomographic image of the thoracic cavity illustrated in FIG. 6, the boundary line between a rib pattern and the patterns of the other organs has the characteristics close to the characteristics of a binary image. Also, the contour line of a character pattern, such as a pattern of identification information, which is embedded in the image with a different method, has the characteristics close to the characteristics of a binary image. As for such an image portion having the characteristics close to the characteristics of a binary image, it is judged that the image portion is located at an image edge portion. Therefore, as for the image portion, the interpolation processing is changed over to the replication interpolation processing, and the sharpness of the image edge portion can thus be prevented from becoming low. Also, as for the image edge portion, at which the response is very strong, even if the aforesaid discontinuous portion occurs, it will not become visually perceptible. Accordingly, no problem will occur practically.

In the image reproducing system of FIG. 1, the interpolation processing apparatus 30 utilizes the primary image signal having been previously stored in the image signal storing device 10. However, the interpolation processing apparatus in accordance with the present invention is not limited to this embodiment. For example, an image signal representing an image, which has been detected by using an image read-out apparatus illustrated in FIG. 7, may be utilized.

Figure 7:
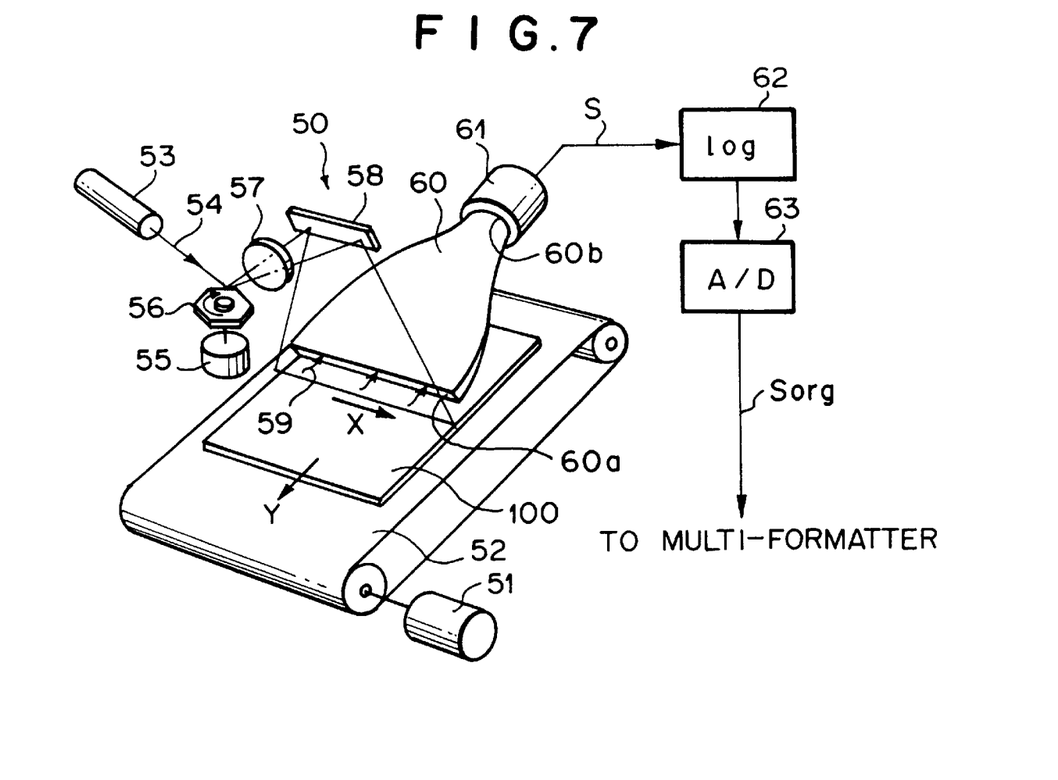
FIG. 7 is a perspective view showing an example of an image read-out apparatus for obtaining a primary image signal, which is used in the embodiment of the interpolation processing apparatus in accordance with the present invention.

Specifically, with the image read-out apparatus illustrated in FIG. 7, an X-ray image of an object, which has been stored on a stimulable phosphor sheet 100, is read from the stimulable phosphor sheet 100.

The stimulable phosphor sheet 100, on which the X-ray image has been stored, is placed at a predetermined position in a read-out means 50 of an X-ray image read-out apparatus. The stimulable phosphor sheet 100 is then conveyed in a sub-scanning direction, which is indicated by the arrow Y, by an endless belt 52, which is operated by a motor 51. A laser beam 54, which serves as stimulating rays, is produced by a laser beam source 53. The laser beam 54 is reflected and deflected by a rotating polygon mirror 56, which is quickly rotated by a motor 55 in the direction indicated by the arrow. The laser beam 54 then passes through a converging lens 57, which may be constituted of an fθ lens, or the like. The direction of the optical path of the laser beam 54 is then changed by a mirror 58, and the laser beam 54 impinges upon the stimulable phosphor sheet 100 and scans it in a main scanning direction indicated by the arrow X, which direction is approximately normal to the sub-scanning direction indicated by the arrow Y. When the stimulable phosphor sheet 100 is exposed to the laser beam 54, the exposed portion of the stimulable phosphor sheet 100 emits light 59 in an amount proportional to the amount of energy stored thereon during its exposure to the X-rays. The emitted light 59 is guided by a light guide member 60 and photoelectrically detected by a photomultiplier 61.

The light guide member 60 is made from a light guiding material, such as an acrylic plate. The light guide member 60 has a linear light input face 60*a*, which is positioned so that it extends along the main scanning line on the stimulable phosphor sheet 100, and a ring-shaped light output face 60*b*, which is positioned so that it is in close contact with a light receiving face of the photomultiplier 61. The emitted light 59, which has entered the light guide member 60 at its light input face 60*a*, is guided through repeated total reflection inside of the light guide member 60, emanates from the light output face 60*b*, and is received by the photomultiplier 61. In this manner, the amount of the emitted light 59, which amount represents the X-ray image, is converted into an electric signal by the photomultiplier 61.

An analog output signal S is generated by the photomultiplier 61. The analog output signal S is logarithmically amplified by a logarithmic amplifier 62, and digitized by an analog-to-digital converter 63. In this manner, an original (primary) image signal Sorg is obtained. The original image signal Sorg is fed into the aforesaid multi-formatter 20.

As described above, the primary image signal, which is utilized in the interpolation processing apparatus 30 in accordance with the present invention may be the one, which has been previously stored in the image signal storing device 10, or may be the one, which is obtained by reading out an image with the image read-out apparatus illustrated in FIG. 7.

What is claimed is:

1. An interpolation processing method for an image signal, wherein an interpolation processing is carried out on an original image signal by combining an interpolation process for images with a comparatively high level of sharpness, and an interpolation process for images with a lower level of sharpness, the method comprising the steps of:

judging whether an interpolation point is located at an image edge portion, at which a change in the original image signal is sharp, wherein said judging step uses a threshold value which is set such that when a desired level of sharpness of an interpolation image obtained from said interpolation processing is low, the threshold value is large, and calculating, in cases where it has been judged that said interpolation point is located at said image edge portion, an interpolated image signal component corresponding to said interpolation point, in accordance with a different interpolation processing which is capable of keeping the image edge portion sharp.

2. A method as defined in claim 1 wherein said judging step comprises comparing the results of an operation carried out on four picture elements neighboring said interpolation point and said threshold value with each other.

3. A method as defined in claim 1 wherein said different interpolation processing, which is capable of keeping the image edge portion sharp, is a replication interpolation processing.

4. A method as defined in claim 1 wherein said interpolation process for images with said comparatively high level of sharpness is a cubic spline interpolating operation process, and said interpolation process for images with said lower level of sharpness is a B spline interpolating operation process.

5. An interpolation processing apparatus for an image signal, comprising:

interpolation processing means for carrying out an interpolation process on an original image signal wherein said interpolation process combines an interpolation processing for images with a comparatively high level of sharpness, and an interpolation processing for images with a lower level of sharpness, judgment means for making a judgment as to whether an interpolation point is located at an image edge portion, at which a change in the original image signal is sharp, the judgment being made by using a predetermined threshold value, a conversion table specifying the relationship between a desired level of sharpness of the interpolation image, which is obtained from said interpolation processing means, and the corresponding predetermined threshold value, such that when said desired level of sharpness of the interpolation image is low, the predetermined threshold value is large, second interpolation processing means for calculating an interpolated image signal component in accordance with an interpolation processing which is capable of keeping an image edge portion sharp, and change-over means for changing the interpolation processing with respect to an interpolation point over to said interpolation processing which is carried out by said second interpolation processing means when said judgment means determines that said interpolation point is located at an image edge portion.

6. An apparatus as defined in claim 5 wherein said interpolation processing, which is capable of keeping the image edge portion sharp, is a replication interpolation processing.

7. An apparatus as defined in claim 5 wherein said interpolation processing for images with said comparatively high level of sharpness is a cubic spline interpolating operation processing, and said interpolation processing for images with said lower level of sharpness is a B spline interpolating operation processing.

* * * * *